(12) United States Patent
Whisnant et al.

(10) Patent No.: US 7,349,823 B2
(45) Date of Patent: Mar. 25, 2008

(54) USING A GENETIC TECHNIQUE TO OPTIMIZE A REGRESSION MODEL USED FOR PROACTIVE FAULT MONITORING

(75) Inventors: Keith A. Whisnant, La Jolla, CA (US); Ramakrishna C. Dhanekula, San Diego, CA (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 78 days.

(21) Appl. No.: 11/359,672

(22) Filed: Feb. 22, 2006

(65) Prior Publication Data
US 2007/0220340 A1  Sep. 20, 2007

(51) Int. Cl.
*G06F 11/00* (2006.01)
(52) U.S. Cl. ...................................... 702/181
(58) Field of Classification Search ................ 702/181
See application file for complete search history.

(56) References Cited

U.S. PATENT DOCUMENTS

| 4,937,763 A | 6/1990 | Mott ........................... 364/550 |
| 2003/0176931 A1* | 9/2003 | Pednault et al. .............. 700/31 |

\* cited by examiner

*Primary Examiner*—Tung S. Lau
(74) *Attorney, Agent, or Firm*—Park, Vaughan & Fleming LLP

(57) ABSTRACT

Embodiments of the present invention provides a system that optimizes a regression model which predicts a signal as a function of a set of available signals. These embodiments use a genetic technique to optimize the regression model, which involves using a portion of the sample signals used to generate each parent regression model from a pair of best-fit parent regression models to generate a child regression model. In addition, in embodiments of the present invention, the system introduces "mutations" to the set of sample signals used to create the child regression model in an attempt to create more robust child regression models during the optimization process.

20 Claims, 3 Drawing Sheets

USING A GENETIC TECHNIQUE TO OPTIMIZE A REGRESSION MODEL USED FOR PROACTIVE FAULT MONITORING

BACKGROUND

1. Field of the Invention

The present invention relates to techniques for proactively detecting impending problems in computer systems. More specifically, the present invention relates to a method and an apparatus for optimizing a regression model using a genetic technique, wherein the regression model is used to detect anomalies in a signal in a computer system.

2. Related Art

Modern server computer systems are typically equipped with a significant number of sensors which monitor signals during the operation of the computer systems. Results from this monitoring process can be used to generate time series data for these signals which can subsequently be analyzed to determine how a computer system is operating. One particularly desirable application of this time series data is for purposes of "proactive fault monitoring" to identify leading indicators of component or system failures before the failures actually occur.

In particular, advanced pattern recognition approaches based on nonlinear kernel regression are frequently used in the proactive fault monitoring, whereby the complex interactions among multivariate signal behaviors are modeled. Using these approaches, a kernel regression model is first constructed during a training phase, wherein correlations among the multiple input signals are learned. In a subsequent monitoring phase, the kernel regression model is used to estimate the values of each input signal as a function of the other input signals. Significant deviations between the estimated values and measured values of the same signal are used to detect potential anomalies in the system under surveillance.

Note that it is desirable to select an appropriate subset of signals from all the available input signals to be included in the kernel regression model. There are a number of criteria by which the performance of a model can be evaluated, which can include: (1) accuracy: ability of the model to correctly estimate the value of a signal in the absence of faults in the system; (2) robustness: ability of the model to maintain accuracy in the presence of signal disturbance (i.e., estimates should not track errors in a faulty signal); and (3) spillover: ability of the model to isolate a faulty signal (i.e., estimates of signal A should not be affected by a fault in signal B). Moreover, it is particularly desirable from a computational standpoint to minimize the number of input signals included in the model without compromising the performances of the model. This is because the computational cost for the kernel regression computations generally scales with the square of the number of input signals in the model.

Unfortunately, conventional approaches for choosing an appropriate subset of signals for a kernel regression model have been primarily based on trial-and-error techniques in combination with rudimentary linear correlation analysis, which are not sufficient to predict the nonlinear correlation behaviors among the input signals. More significantly, there are often a large number of available signals in a computer system (e.g., >1000 signals in a high-end server system). Computational cost makes it intractable to examine all possible combinations of these signals to determine the optimal subset to be included in a model using the conventional approaches.

What is needed is a computationally efficient technique for optimizing a kernel regression model without the above-described problems.

SUMMARY

One embodiment of the present invention provides a system that optimizes a regression model which predicts a signal as a function of a set of available signals. During operation, the system receives training data for the set of available signals from a computer system during normal fault-free operation. The system also receives an objective function which can be used to evaluate how well a regression model predicts the signal. Next, the system initializes a pool of candidate regression models which includes at least two candidate regression models, wherein each candidate regression model in the pool includes a subset of the set of available signals. The system then optimizes the regression model by iteratively: (1) selecting two regression models U and V from the pool of candidate regression models, wherein regression models U and V best predict the signal based on the training data and the objective function; (2) using a genetic technique to create an offspring regression model W from U and V by combining parts of the two regression models U and V; and (3) adding W to the pool of candidate regression models.

In a variation on this embodiment, each candidate regression model in the pool is represented using an n-bit binary string, wherein n is the total number of signals in the set of available signals, and wherein each bit in the n-bit binary string is associated with a corresponding signal in the set of available signals. Note that the ith bit in the n-bit binary string which is associated with a candidate regression model is set to "one" if the ith signal in the set of available signals is included in the candidate regression model, or "zero" if the ith signal in the set of available signals is not included in the candidate regression model.

In a variation on this embodiment, the objective function takes into account a set of performance criteria for a candidate regression model, which can include: (1) accuracy; (2) robustness; (3) spillover, which determines how much a disturbance on a signal included in the candidate regression model affects the prediction results for the signal generated by the candidate regression model; (4) the number of signals included in the candidate regression model; and (5) other performance criteria.

In a further variation on this embodiment, the objective function is configured to minimize the number of signals included in the candidate regression model without significantly compromising other performance criteria.

In a variation on this embodiment, the system uses a set of stopping criteria to determine when to terminate the iterative process.

In a further variation on this embodiment, the set of stopping criteria can include: (1) a set of thresholds on the objective function; or (2) a specified number of iterations.

In a variation on this embodiment, the system creates the offspring regression model W from U and V by: (1) selecting a crossover point k, wherein k is an integer between 1 and n; (2) creating W by combining U and V such that the first k bits of W are the first k bits of U, and the last (n-k) bits of W are the last (n-k) bits of V; and (3) reversing one bit within W with a predetermined probability p.

In a variation on this embodiment, the system uses the optimized regression model during a monitoring phase to predict the signal for proactive fault detection purposes.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Real-Time Telemetry System with Kernel Regression Model Optimizer

Figure 1:
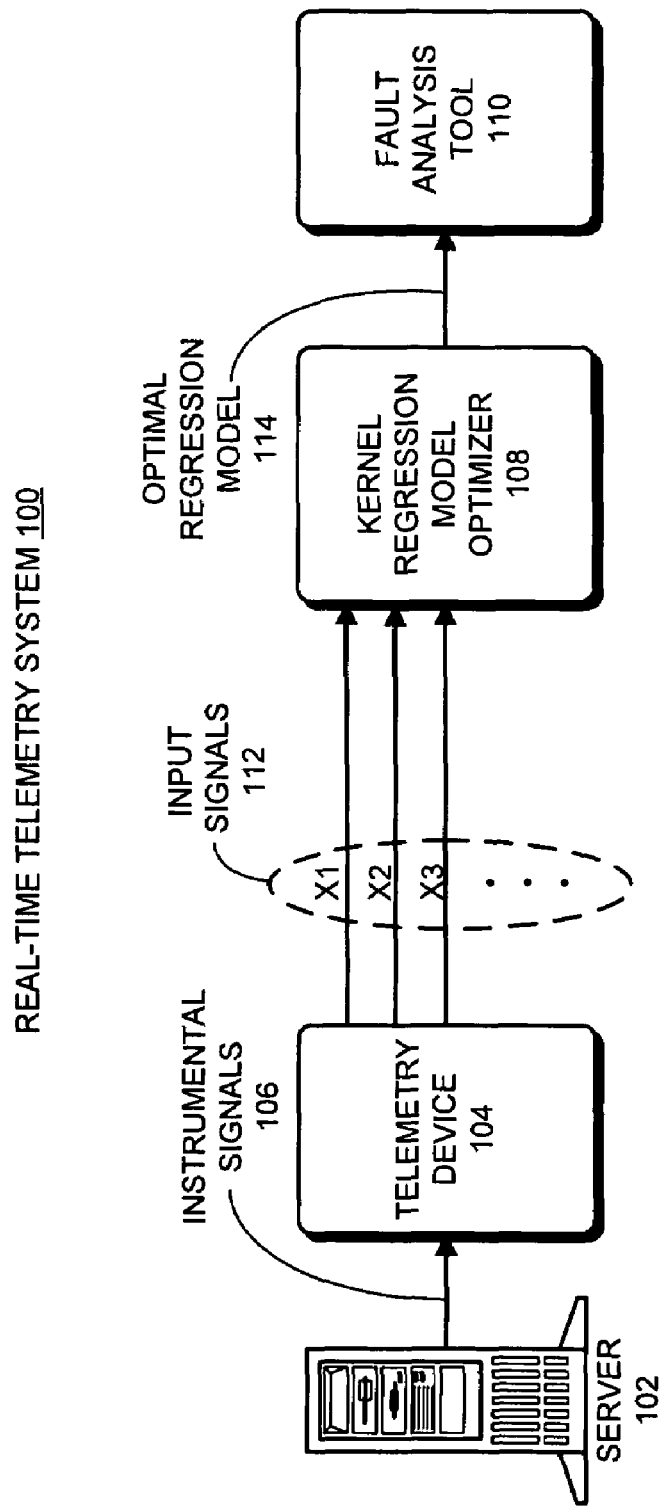
FIG. 1 illustrates a real-time telemetry system with a kernel regression model optimizer in accordance with an embodiment of the present invention.

FIG. 1 illustrates real-time telemetry system 100 with a kernel regression model optimizer in accordance with an embodiment of the present invention. Real-time telemetry system 100 contains server 102. Server 102 can generally include any computational node including a mechanism for servicing requests from a client for computational and/or data storage resources. In the present embodiment, server 102 is a uniprocessor or multiprocessor server that is being monitored by real-time telemetry system 100.

Note that the present invention is not limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

Real-time telemetry system 100 also contains telemetry device 104, which gathers instrumental signals 106 from the various sensors and monitoring tools within server 102, and directs instrumental signals 106 to a remote location that contains kernel regression model optimizer 108, and fault analysis tool 110.

Note that instrumental signals 106 can include signals associated with physical performance parameters measured through sensors within the computer system. For example, the physical parameters can include distributed temperatures within the computer system, relative humidity, cumulative or differential vibrations within the computer system, fan speed, acoustic signals, currents, voltages, time-domain reflectometry (TDR) readings, and miscellaneous environmental variables.

Kernel regression model optimizer 108 receives a set of input signals 112 from telemetry device 104, wherein each signal $X_i$ in the set of input signals 112 is distinctly associated with a distinct physical signal from server 100. Kernel regression model optimizer 108 constructs regression models to reflect the correlations among input signals 112, wherein the models are used to estimate the values of each signal in the set of input signals 112 as a function of the other signals in the set of input signals 112.

Kernel regression model optimizer 108 additionally performs model selection which determines an optimal regression model 114. Specifically, kernel regression model optimizer 108 performs evaluations on all candidate regression models based on a set of rules and constraints. Optimizer 108 also provides a computationally efficient approach for choosing an optimal subset of input signals 112 to be included in optimal regression model 114. More specifically, optimizer 108 optimizes a regression model using a genetic technique, which is described in more detail below.

Fault analysis tool 110 then uses optimal regression model 114 during the monitoring phase to estimate a signal as a function of other input signals for proactive fault detection purposes. Significant deviations between the estimates and measured signal values can be used to detect a potential anomaly in the signal.

Optimizing the Regression Model Using a Genetic Technique

A genetic technique approximates an optimal solution to a problem through a process that mimics natural selection. During a selection operation, the fitness of candidate solutions is compared against each other through an objective function that depends on a set of variables. Next, two selected "fit" solutions are "combined" to produce an "offspring" solution. The motivation is that if the two fit solutions are combined, then the resulting solution can inherit the best traits of the both "parent" solutions, thereby producing the offspring solution that is even more fit than the parent solutions. This process then repeats, producing successively better solutions during each iteration. In addition to combining two solutions to create a third one, there is typically a mutation operation that "alters" a solution, which mimics random mutations to species in natural selection. With a specific set of rules and constraints, the genetic technique can quickly scan a vast solution set and search for an optimal solution. A more-detailed description on the genetic technique is found in John Holland's book, *"Adaptation in Natural and Artificial Systems,"* University of Michigan Press, Ann Arbor, 1975.

Figure 2:
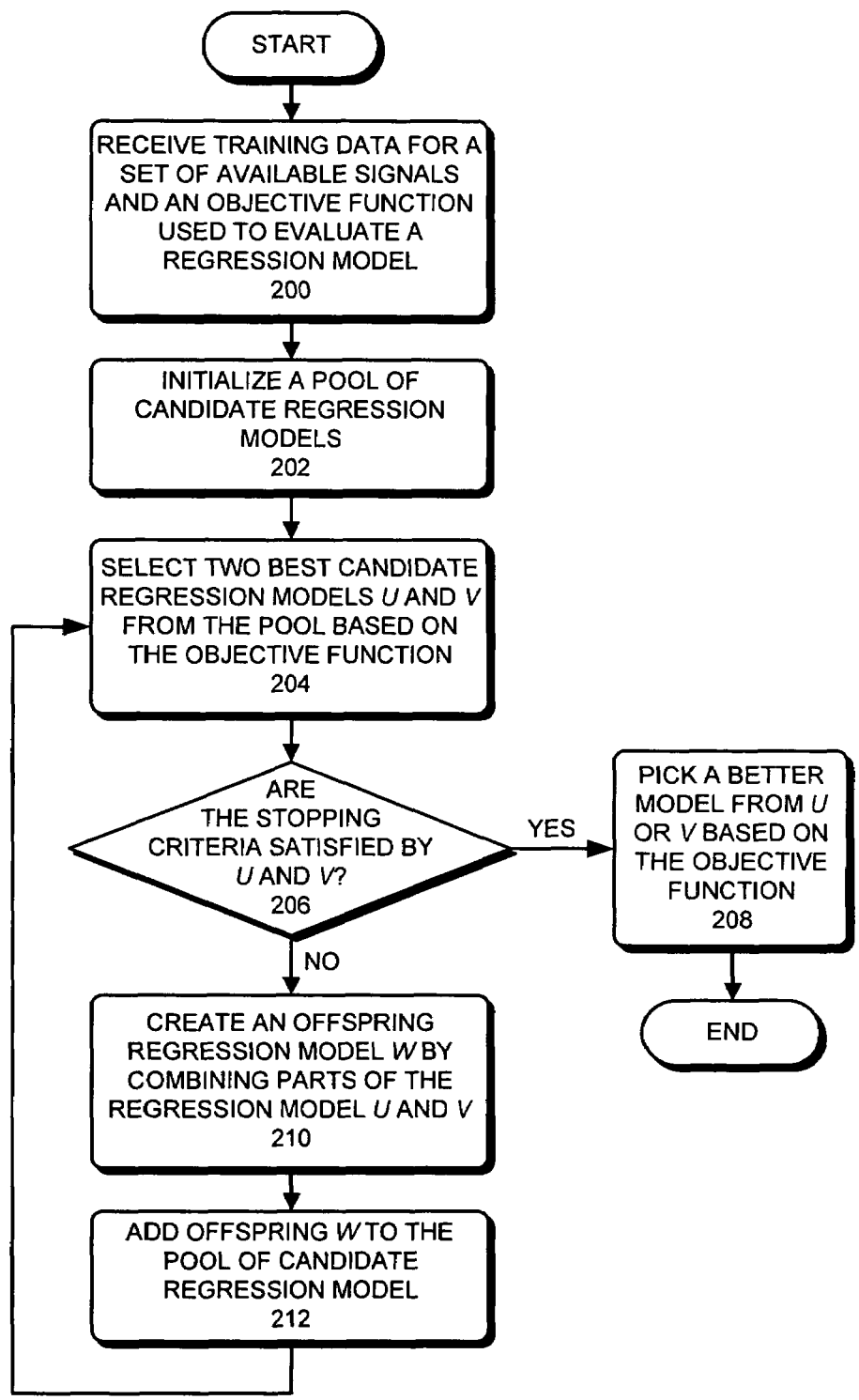
FIG. 2 presents a flowchart illustrating the process of optimizing a regression model using the genetic technique in accordance with an embodiment of the present invention.

FIG. 2 presents a flowchart illustrating the process of optimizing a regression model using the genetic technique in accordance with an embodiment of the present invention. Note that the objective of the optimization process is to select a subset of the available signals as input variables in the regression model, and then use the regression model to predict a signal as a function of the input variables.

During operation, the system receives training data for the set of available signals from a computer system during normal fault-free operation. The system also receives an objective function which can be used to evaluate how well a regression model predicts the signal (step 200). This objective function is comprised of a set of performance metrics and constraints, which will be discussed in more detail below.

Next, the system initializes a pool of candidate regression models which includes at least two candidate regression models in the initial pool (step 202). Note that each candidate regression model in the pool can include a randomly selected subset of all the available signals. More specifically, each candidate regression model in the pool is represented using an n-bit binary string, wherein n is the total number of signals in the set of available signals, and wherein each bit in the n-bit binary string is associated with a corresponding signal in the set of available signals. In one embodiment of the present invention, the ith bit in the n-bit binary string is set to either "one" if the ith signal in the set of available signals is included in the candidate regression model; or "zero" if the ith signal in the set of available signals is not included in the candidate regression model. Typically, a poor candidate regression model in the initial pool does not affect the end solution because it will be discarded by subsequent selection procedure.

The system then iteratively selects two candidate regression models U and V from the pool of candidate regression models (step 204). Specifically, the system selects regression models U and V which best predict the signal based on the training data and the objective function.

The system next uses a set of stopping criteria to determine whether to terminate the iterative process at this point (step 206). In one embodiment of the present invention, the set of stopping criteria can include a set of thresholds imposed on the objective function or simply a predetermined number of iterations. If the system determines that the stopping criteria are satisfied by the selected regression models U and V, the system then picks the better model from U or V based on the objective function (step 208), and subsequently terminates the optimization process.

Figure 3:
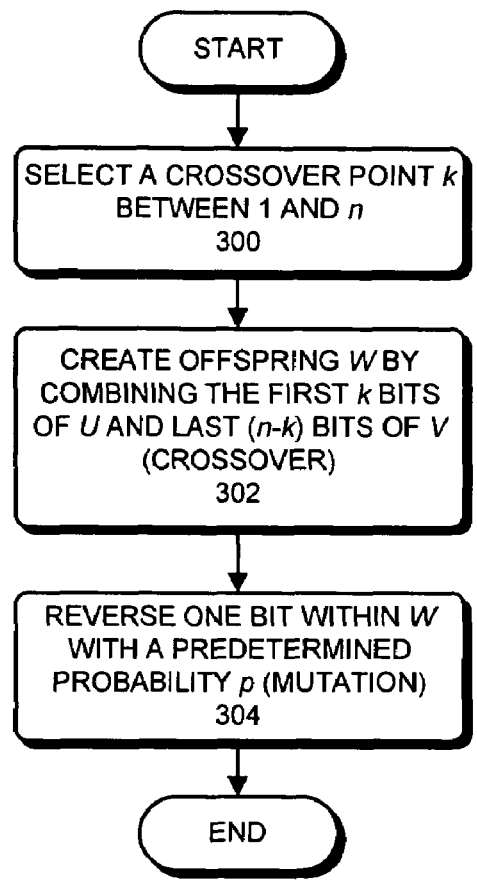
FIG. 3 presents a flowchart illustrating the process of creating the offspring W by combining two candidate regression models U and V in accordance with an embodiment of the present invention.

Otherwise, the system uses the genetic technique to create an offspring regression model W from U and V by combining parts of the two selected regression models U and V (step 210). FIG. 3 presents a flowchart illustrating the process of creating the offspring W by combining two candidate regression models U and V in accordance with an embodiment of the present invention.

Figure 4:
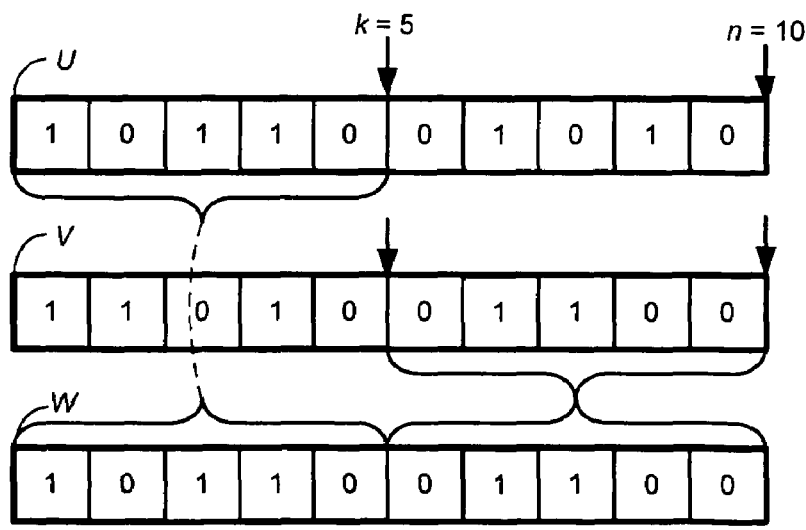
FIG. 4 illustrates an exemplary crossover step to create offspring W from models U and V in accordance with an embodiment of the present invention.

The system first selects a crossover point k, wherein k is an integer between 1 and n (step 300). Next, the system creates W by combining U and V such that the first k bits of W are the first k bits of U, and the last (n-k) bits of W are the last (n-k) bits of V (step 302). This process is referred to as "crossover". FIG. 4 illustrates an exemplary crossover step to create offspring W from models U and V in accordance with an embodiment of the present invention. Note that we select n=10, and k=5 in this example for simplicity.

Note that the crossover step is not limited to the process described in step 302. In one embodiment of the present invention, a crossover step can include two or more crossover points, which partition the n-bit binary string into three or more sections. Next, sections of the two candidate models are combined to form offspring W. For example, if two crossover points p and q (1<p<q<n) are selected, offspring W may be created by combining first p bits of U, the middle (q-p) bits of V, and the last (n-q) bits of U.

After the crossover step, the system then reverses one bit within W with a predetermined probability p (step 304), which is typically referred to as a "mutation". Note that the probability p controls the "mutation" probability in each iteration. Typically, the mutation occurs only occasionally in the offspring based on a p value which is much less than one.

Also note that reserving a specific bit in the model can have the effect of both adding and removing the input signal associated with the specific bit being flipped. For example, by reversing ith bit from 1 to 0, the corresponding ith input signal is removed from the model.

Referring back to the process of FIG. 2, the system next adds offspring model W to the pool of candidate regression models (step 212). The system then returns to step 204 and repeats {selection parents→creating offspring} cycle. As the pool of candidate models grows larger, the models that are deemed as inferior may be marked and skipped for further examination, thereby saving computational time.

The objective function is used to select the "fittest" models from the pool. A weighted combination of a set of performance metrics and constraints is used in formulating the objective function, which is then used to compare models against each other. These performance metrics and constraints can include but are not limited to the ones listed below:

Accuracy: measures how well the estimated values $\hat{u}_i$ for signal u by a model agree with the measured values $u_i$ of signal u in the absence of faults. In one embodiment of the present invention, the accuracy can be represented in the form of the mean square error from m training observations of signal u as:

$$\frac{1}{m}\sum_{i=1}^{m}(\hat{u}_i - u_i)^2.$$

In this embodiment, a smaller value indicates a better model.

Robustness: measures the robustness of a model with respect to disturbances appearing in signal u. We use $\hat{u}_i'$ to represent disturbed signal values predicted by a model, $u_i'$ to represent disturbed signal values from measurements, and $\hat{u}_i$, $u_i$ to represent undisturbed signals from prediction and measurement, respectively. In one embodiment of the present invention, the robustness can then be computed by:

$$\frac{1}{m}\sum_{i=1}^{m}\frac{\hat{u}_i' - \hat{u}_i}{u_i' - u_i}.$$

Again, in this embodiment, a smaller value indicates a better model, which suggests that the disturbance does not propagate through the model to the prediction results of the model.

Spillover: measures how much a disturbance on a signal u included in the candidate regression model affects the prediction results for the signal v generated by the candidate regression model. We use $\hat{v}_i'$ to represent disturbed signal values, $\hat{v}_i$ to represent undisturbed signal values predicted by the model, and $u_i'$, $u_i$ to represent both disturbed and undisturbed signal u from measurement, respectively. In one embodiment of the present invention, the robustness can then be computed by $$\frac{1}{m}\sum_{i=1}^{m}\frac{\hat{v}'_i - \hat{v}_i}{u'_i - u_i}.$$

Once again, in this embodiment of the spillover metric, a smaller value indicates a better model.

Number of signals in a model: In a preferred embodiment of the present invention, the objective function is configured to minimize the number of signals included in the candidate regression model without significantly compromising other performance metrics and constraints.

Note that the above-described technique provides a computationally efficient approach for choosing the input signals to be included in a kernel regression model. The technique avoids the well-known problem of "combinatorial explosion" which occurs when one attempts to try all possible combinations of available input signals and seek an optimal combination via conventional constrained optimization. Also note that the model generated through the technique is near optimal in the sense that its performance exceeds nearly every other possible model that can be constructed from the same set of available input signals.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing a regression model which predicts a signal as a function of a set of available signals, the method comprising:
    receiving training data for the set of available signals from a computer system during normal fault-free operation;
    receiving an objective function which can be used to evaluate how well a regression model predicts the signal;
    initializing a pool of candidate regression models which includes at least two candidate regression models, wherein each candidate regression model in the pool includes a some or all of the set of n available signals;
    optimizing the regression model by iteratively
        selecting two regression models U and V from the pool of candidate regression models, wherein regression models U and V best predict the signal based on the training data and the objective function;
        using a genetic technique to create an offspring regression model W from U and V by combining some of the signals included in the two regression models U and V by
            selecting a crossover point k, wherein k is an integer between 1 and n;
            creating W by combining the signals included in U and V such that the first k signals of the n available signals included in W match the first k signals included in U, and the last (n-k) signals included in W match the last (n-k) signals included in V;
            reversing the inclusion of one signal in W with respect to the inclusion of the signal in U or V with a predetermined probability p; and
            adding W to the pool of candidate regression models;
    upon determining that a stopping criteria has been satisfied by the two regression models U and V, using the objective function to select one of the regression models U and V that best predicts the signal; and
    using the selected regression model to predict a value of the signal during operation of the computer system.

2. The method of claim 1, wherein each candidate regression model in the pool is represented using an n-bit binary string,
    wherein n is the total number of signals in the set of available signals;
    wherein each bit in the n-bit binary string is associated with a corresponding signal in the set of available signals; and
    wherein the ith bit in the n-bit binary string which is associated with a candidate regression model is set to:
        one if the ith signal in the set of available signals is included in the candidate regression model; or
        zero if the ith signal in the set of available signals is not included in the candidate regression model.

3. The method of claim 1, wherein the objective function takes into account a set of performance criteria for a candidate regression model, which can include:
    accuracy;
    robustness;
    spillover, which determines how much a disturbance on a signal included in the candidate regression model affects the prediction results for the signal generated by the candidate regression model;
    the number of signals included in the candidate regression model; and
    other performance criteria.

4. The method of claim 1, wherein the method further comprises using a set of stopping criteria to determine when to terminate the iterative process.

5. The method of claim 1, wherein the method further comprises using the optimized regression model during a monitoring phase to predict the signal for proactive fault detection purposes.

6. The method of claim 3, wherein the objective function is configured to minimize the number of signals included in the candidate regression model without significantly compromising other performance criteria.

7. The method of claim 4, wherein the set of stopping criteria can include:
    set of thresholds on the objective function; or
    a specified number of iterations.

8. A computer-readable storage medium storing instructions that when executed by a computer cause the computer to perform a method for optimizing a regression model which predicts a signal as a function of a set of available signals, the method comprising:
    receiving training data for the set of available signals from a computer system during normal fault-free operation;
    receiving an objective function which can be used to evaluate how well a regression model predicts the signal;
    initializing a pool of candidate regression models which includes at least two candidate regression models, wherein each candidate regression model in the pool includes a some or all of the set of n available signals; and optimizing the regression model by iteratively,
    selecting two regression models U and V from the pool of candidate regression models, wherein regression models U and V best predict the signal based on the training data and the objective function;
    using a genetic technique to create an offspring regression model W from U and V by combining some of the signals included in two regression models U and V by
        selecting a crossover point k, wherein k is an integer between 1 and n;
        creating W by combining the signals included in U and V such that the first k signals of the n available signals included in W match the first k signals included in U, and the last (n-k) signals included in W match the last (n-k) signals included in V;
        reversing the inclusion of one signal in W with respect to the inclusion of the signal in U or V with a predetermined probability p; and
        adding W to the pool of candidate regression models;
    upon determining that a stopping criteria has been satisfied by the two regression models U and V, using the objective function to select one of the regression models U and V that best predicts the signal and
    using the selected regression model to predict a value of the signal during operation of the computer system.

9. The computer-readable storage medium of claim 8, wherein each candidate regression model in the pool is represented using an n-bit binary string,
    wherein n is the total number of signals in the set of available signals;
    wherein each bit in the n-bit binary string is associated with a corresponding signal in the set of available signals; and
    wherein the ith bit in the n-bit binary string which is associated with a candidate regression model is set to:
        one if the ith signal in the set of available signals is included in the candidate regression model; or
        zero if the ith signal in the set of available signals is not included in the candidate regression model.

10. The computer-readable storage medium of claim 8, wherein the objective function takes into account a set of performance criteria for candidate regression model, which can include:
    accuracy;
    robustness;
    spillover, which determines how much a disturbance on a signal included in the candidate regression model affects the prediction results for the signal generated by the candidate regression model;
    the number of signals included in the candidate regression model; and
    other performance criteria.

11. The computer-readable storage medium of claim 8, wherein the method further comprises using a set of stopping criteria to determine when to terminate the iterative process.

12. The computer-readable storage medium of claim 8, wherein the method further comprises using the optimized regression model during a monitoring phase to predict the signal for proactive fault detection purposes.

13. The computer-readable storage medium of claim 10, wherein the objective function is configured to minimize the number of signals included in the candidate regression model without significantly compromising other performance criteria.

14. The computer-readable storage medium of claim 11, wherein the set of stopping criteria can include:
    a set of thresholds on the objective function; or
    a specified number of iterations.

15. An apparatus for optimizing a regression model which predicts a signal as a function of a set of available signals, comprising:
    a receiving mechanism configured to receive training data for the set of available signals from a computer system during normal fault-free operation;
    a receiving mechanism configured to receive an objective function which can be used to evaluate how well a regression model predicts the signal;
    an initialization mechanism configured to initialize a pool of candidate regression models which includes at least two candidate regression models, wherein each candidate regression model in the pool includes a some or all of the set of n available signals;
    an optimization mechanism configured to optimize the regression model by iteratively,
        selecting two regression models U and V from the pool of candidate regression models, wherein regression models U and V best predict the signal based on the training data and the objective function;
        using a genetic technique to create an offspring regression model W from U and V by combining some of the signals included in the two regression models U and V by
            selecting a crossover point k, wherein k is an integer between 1 and n;
            creating W by combining the signals included in U and V such that the first k signals of the n available signals included in W match the first k signals included in U, and the last (n-k) signals included in W match the last (n-k) signals included in V;
            reversing the inclusion of one signal in W with respect to the inclusion of the signal in U or V with a predetermined probability p; and
            adding W to the pool of candidate regression models
    a selection mechanism, wherein upon determining that a stopping criteria has been satisfied by the two regression models U and V, the selection mechanism is configured to use the objective function to select one of the regression models U and V that best predicts the signal; and
    a prediction mechanism configured to use the selected regression model to predict a value of the signal during operation of the computer system.

16. The apparatus of claim 15, wherein each candidate regression model in the pool is represented using an n-bit binary string,
    wherein n is the total number of signals in the set of available signals;
    wherein each bit in the n-bit binary string is associated with a corresponding signal in the set of available signals; and
    wherein the ith bit in the n-bit binary string which is associated with a candidate regression model is set to:
        one if the ith signal in the set of available signals is included in the candidate regression model; or
        zero if the ith signal in the set of available signals is not included in the candidate regression model.

17. The apparatus of claim 15, wherein the objective function takes into account a set of performance criteria for a candidate regression model, which can include:
    accuracy;
    robustness;

spillover, which determines how much a disturbance on a signal included in the candidate regression model affects the prediction results for the signal generated by the candidate regression model;

the number of signals included in the candidate regression model; and other performance criteria.

18. The apparatus of claim 15, further comprising a determination mechanism configured to use a set of stopping criteria to determine when to terminate the iterative process.

19. The apparatus of claim 17, wherein the objective function is configured to minimize the number of signals included in the candidate regression model without significantly compromising other performance criteria.

20. The apparatus of claim 18, wherein the set of stopping criteria can include:

a set of thresholds on the objective function; or a specified number of iterations.

* * * * *